United States Patent [19]
Bolton

[11] 3,919,842
[45] Nov. 18, 1975

[54] CONTROLLER FOR PROPORTIONAL CONTROL OF REDUCING CONVERTER AIR

[75] Inventor: Robert A. Bolton, Sterling Heights, Mich.

[73] Assignee: General Motors Corporation, Detroit, Mich.

[22] Filed: May 31, 1974

[21] Appl. No.: 474,888

[52] U.S. Cl. .................... 60/289; 60/301; 60/306; 137/101; 137/117
[51] Int. Cl.² .......................................... F01N 3/10
[58] Field of Search ............ 60/289, 301, 306, 290; 137/101, 117

[56] References Cited
UNITED STATES PATENTS

| | | | |
|---|---|---|---|
| 2,980,173 | 4/1961 | Perkey | 137/117 |
| 3,733,829 | 5/1973 | Henault | 60/301 |
| 3,757,521 | 9/1973 | Tourtellotte | 60/301 |
| 3,826,089 | 7/1974 | Nakajima | 60/306 |
| 3,852,959 | 12/1974 | Weisgerber | 60/307 |

*Primary Examiner*—Douglas Hart
*Attorney, Agent, or Firm*—Arthur N. Krein

[57] ABSTRACT

A controller in the exhaust emission control system for the engine of an automotive vehicle controls secondary airflow between a region ahead of a reducing converter and a region intermediate the reducing converter and an oxidizing converter, the amount of air introduced ahead of the reducing converter being proportional to engine exhaust flow and is preferably introduced closely adjacent to the exhaust ports of the engine. The controller, adapted to be connected to a source of secondary air, includes a fixed area bleed orifice which controls airflow to a region ahead of the reducing converter and a fluid pressure actuated valve which controls airflow to the region intermediate the reducing converter and the oxidizing converter.

4 Claims, 5 Drawing Figures

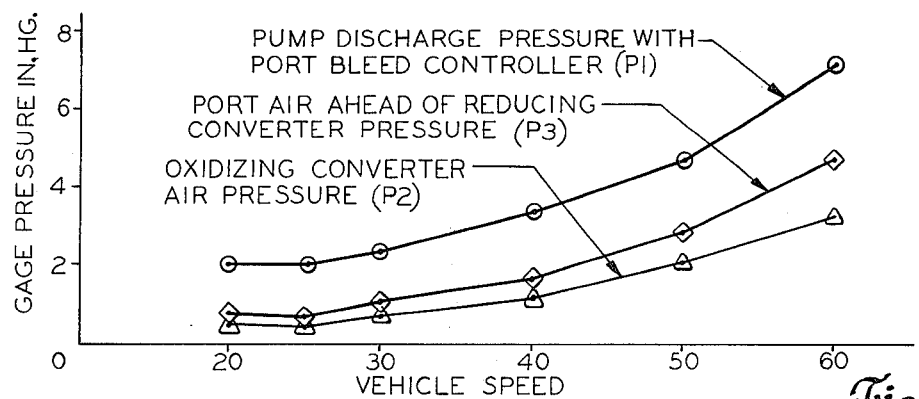
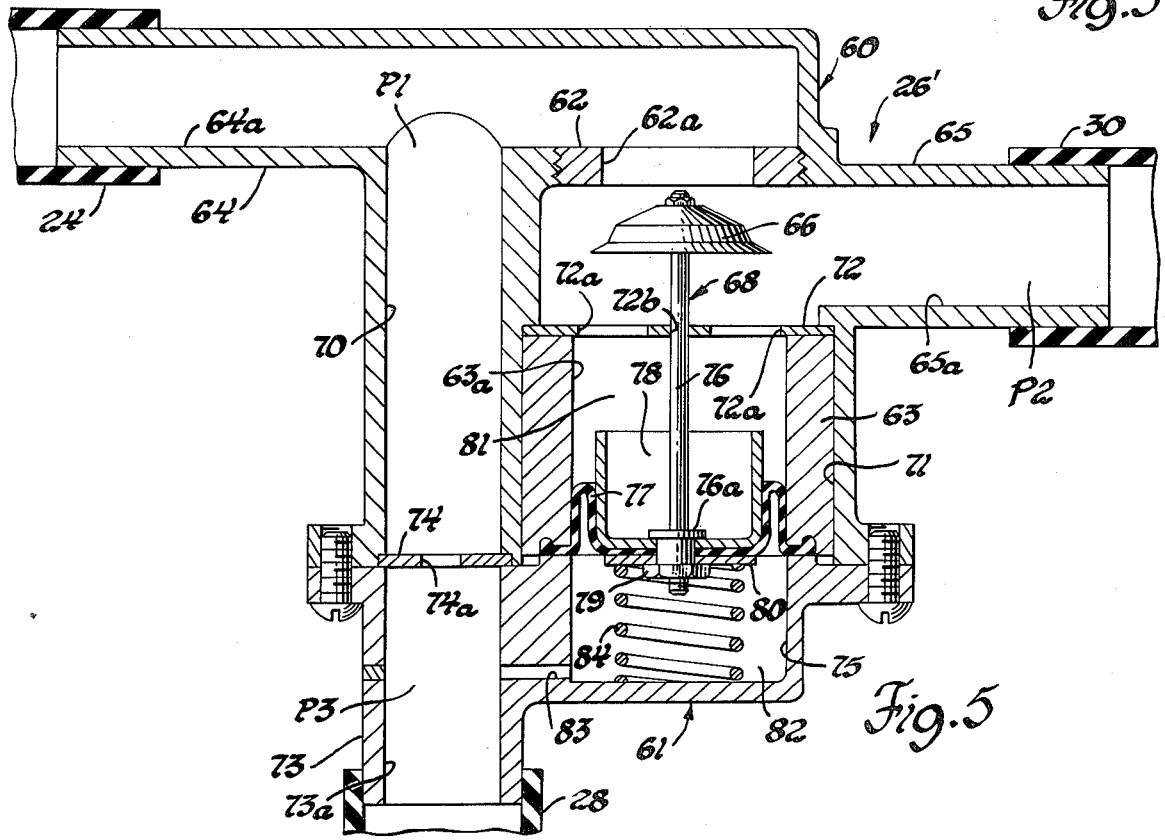
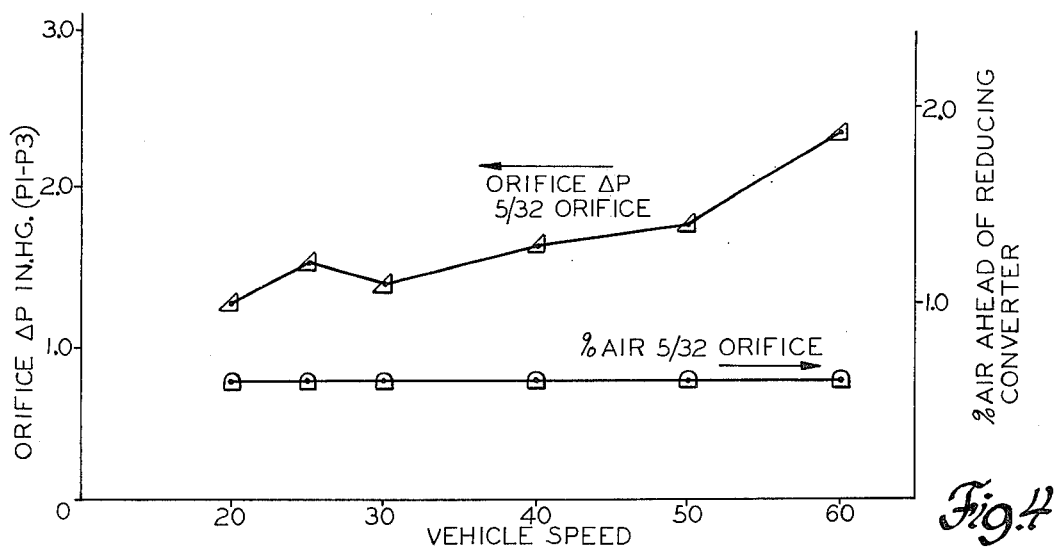

CONTROLLER FOR PROPORTIONAL CONTROL OF REDUCING CONVERTER AIR

This invention relates to the control of secondary airflow in a catalytic exhaust purification system for the engine of a vehicle and, in particular, to a controller for proportional control of reducing converter air in such a system.

Exhaust emission control systems, in use for the purification of vehicle exhaust gases, provide for the passage of the exhaust fumes through a catalytic converter comprising materials whose exposure to the noxious exhaust elements will catalytically react the elements thereby converting them into an innocuous form whose presence in the atmosphere is not objectionable. The catalytic converter may be a dual bed type converter having one bed which will effect conversion of the carbon monoxide and hydrocarbons and the other bed for the reduction of the oxides of nitrogen. In such dual bed converter systems, the beds may be arranged in separate canisters or in a single canister and may be arranged to have the exhaust gases passed serially therethrough with secondary air being introduced between the two beds, that is, ahead of the second bed or oxidizing converter thereby creating therein an oxidizing atmosphere for conversion of carbon monoxide hydrocarbons. Lack of excess oxygen in the first bed or reducing converter will create a reducing atmosphere therein for reaction of the nitric oxides.

However, some reducing catalysts require an atmosphere containing some oxygen. This can be accomplished by introducing a small amount of secondary air ahead of the reducing converter. If too much air is used, the reducing converter will, in effect, see an oxidizing atmosphere. If too little air is used, too much ammonia will be formed by the reducing catalysts. Both of these conditions will result in loss of reducing converter efficiency. Various systems, with one or more valves incorporated therein, have been proposed to control the flow of secondary air ahead of the reducing converter and to control the flow of air to the oxidizing converter, the control of these airflows being effected by one or more of these valves which are responsive to engine or exhaust temperatures and possibly engine vacuum.

It has now been found that the amount of secondary air introduced ahead of the reducing converter should be proportional to the flow of exhaust gases from the engine thereto.

It is therefore the primary object of this invention to provide a controller for the proportional control of secondary airflow to a region ahead of the reducing converter in a dual bed converter exhaust emission control system for a vehicle engine.

Another object of this invention is to provide a reducing converter airflow controller for an internal combustion engine exhaust emission control system whereby the flow of secondary air introduced into the system upstream of the reducing converter of a dual bed catalytic converter unit is proportional to the exhaust flow thereto.

A still further object of this invention is to provide a controller for controlling the flow of secondary air to a region ahead of a reducing converter and to a region intermediate the reducing converter and an oxidizing converter in the exhaust emission control system for an internal combustion engine, the controller including an orifice for control of airflow ahead of the reducing converter and a differential fluid pressure actuated valve controlling airflow to the region between the reducing converter and the oxidizing converter.

These and other objects of the invention are obtained in an exhaust emission control system having a reducing converter and an oxidizing converter by a secondary airflow controller provided with an inlet passage connected to a source of secondary air and having a first discharge passage connected to a region ahead of the reducing converter and a second discharge passage connected to a region intermediate the reducing converter and the oxidizing converter, the inlet passage and the first discharge passage of the controller being interconnected by a fixed orifice passage and a differential fluid pressure actuated valve interconnecting the inlet passage to the second discharge passage of the controller. Preferably, the air introduced into the region ahead of the reducing converter is introduced closely adjacent to the exhaust ports of the engine.

For a better understanding of the invention, as well as other objects and further features thereof, reference is had to the following detailed description of the invention to be read in connection with the accompanying drawings, wherein:

FIG. 3 is a graph of secondary air pressures in various portions of the controller of FIG. 2 as a function of vehicle speed;

FIG. 4 is a graph of the pressure drop across the bleed orifice of the controller and percent of bleed air delivered as a function of vehicle speed; and, FIG. 5 is a sectional view of an alternate embodiment of a controller constructed in accordance with the invention.

Figure 1:
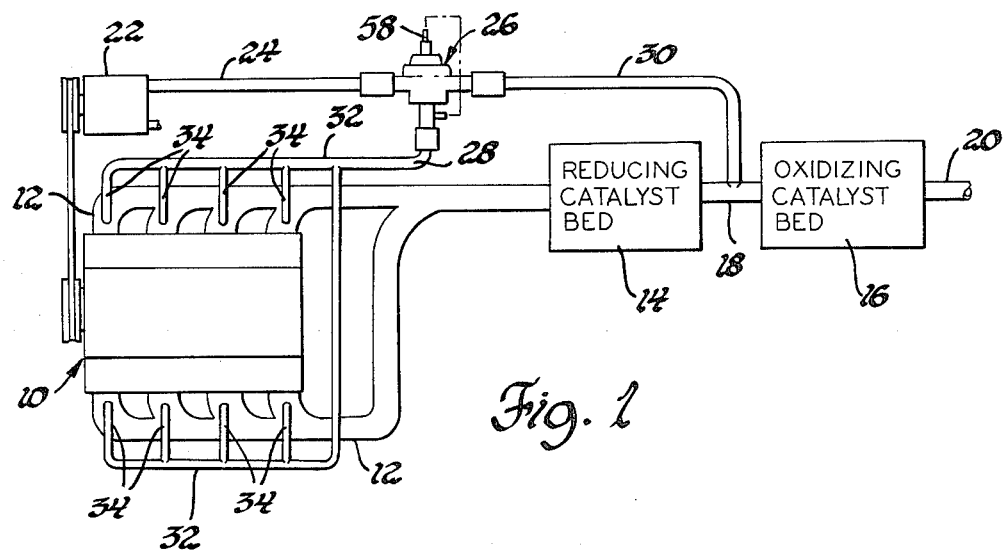
FIG. 1 is a schematic illustration of an internal combustion engine having a dual bed catalytic converter exhaust emission control system with the flow of secondary air being controlled by a controller in accordance with the invention.

Referring now to FIG. 1, there is schematically illustrated an internal combustion engine 10 for an automotive vehicle, not shown, having an exhaust emission control system including exhaust manifold 12 for receiving the exhaust gases discharged from the engine. The exhaust manifolds 12 are interconnected for discharge of exhaust gases through a dual bed catalytic converter including a reducing converter 14, having a reducing catalyst bed therein, and an oxidizing converter 16, having an oxidizing catalyst bed therein, these two converters being shown as enclosed by separate canisters and interconnected by a connector exhaust duct 18. The outlet side of the oxidizing converter 16 is connected to a conventional exhaust tailpipe 20.

An air pump 22, which may be engine driven in a conventional manner, as shown, is used to deliver secondary air through a conduit 24 to a controller, generally designated 26, constructed in accordance with the invention, which operates in a manner to be described to deliver secondary air via conduit 28 to a region ahead of the reducing converter 14 and via a conduit 30 to a region intermediate the reducing converter 14 and oxidizing converter 16, as by having conduit 30 connected to exhaust duct 18.

Although the secondary air delivered through conduit 28 can be introduced into the exhaust stream any place ahead of the reducing converter 14, it is preferably introduced, as shown, closely adjacent to the exhaust ports, not shown, of the engine 10. For this purpose, each of the exhaust manifolds 12 has an air injection unit in the form of an air manifold 32 positioned adjacent to it and which is provided with a series of injection tubes 34 extending into the exhaust manifolds and terminating downstream of and closely adjacent to the exhaust valve in each of the engine cylinders, not shown, whereby secondary air delivered through these injection tubes is injected into the stream of exhaust gases or combustibles flow paths adjacent to each of the exhaust valves of these cylinders.

Figure 2:
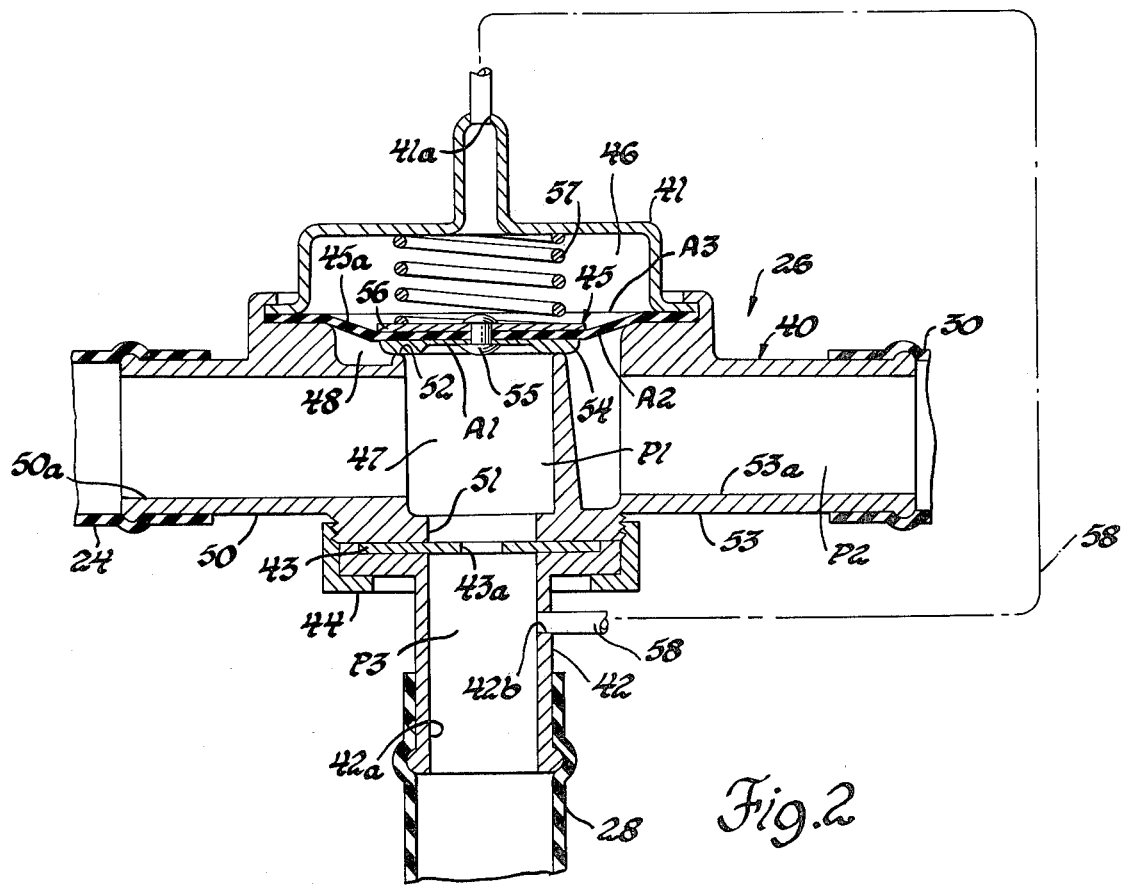
FIG. 2 is a sectional view of a preferred embodiment of the controller of FIG. 1.

Referring now to the subject matter of the invention, a preferred embodiment of the controller 26 is shown in FIG. 2 and it includes a manifold body or housing 40 with a top cap 41, a bottom connector 42, an orifice plate 43 and threaded, flanged retainer ring 44 which, suitably fixed together, make up a controller casing. The housing 40 and top cap 41 form with a control valve assembly, generally designated 45, three chambers. The three chambers thus provided are an upper chamber 46, a lower central chamber 47 and an annular lower chamber 48.

Housing 40 is provided with a tube connection 50 for connection to conduit 24 for entry of secondary air, the inlet passage 50a of this tube connection 50 being in communication with the central chamber 47. Chamber 47, at its lower end is in communication with a short, generally vertically disposed, annular discharge passage 51 and at its other end is normally closed by the valve assembly 45 seating on one side thereof on the annular valve seat 52 encircling the upper end of this chamber and, in effect, forming part of a partition wall separating chambers 47 and 48.

Housing 40 is also provided with a tube connection 53 for connection to conduit 30 for discharge of secondary air to the region between the reducing converter 14 and the oxidizing converter 16, the discharge passage 53a of this connection being in communication with the chamber 48.

Bottom connector 42 is connected to conduit 28 for discharge of secondary air to a region ahead or upstream of the reducing converter, the discharge passage 42a of this connector being in communication via a fixed size bleed orifice passage 43a in the orifice plate 43 with the discharge passage 51 and, therefore, with central chamber 47 and inlet passage 50a. Since secondary air flowing through orifice 43a is preferably delivered closely adjacent to the exhaust ports, this orifice may be referred to as a port bleed for secondary air.

The valve assembly 45, which is a differential fluid pressure actuated diaphragm type valve, includes a disk-shaped valve 54 adapted to cooperate with the valve seat 52 and which is fixed as by a rivet 55 to the central portion of a diaphragm 45a on one side or lower side thereof, with a retainer plate 56 on the opposite side of the diaphragm. Diaphragm 45a is sealingly clampled at its outer periphery between housing 40 and cap 41. The diaphragm 45a and, therefore, valve 54 are normally biased downward, with reference to FIG. 2, to the valve closed position by a spring 57 abutting at one end against the retainer plate 56 and at its opposite end against the inside surface of cap 41. In addition, the upper surface area of the diaphragm 45a of the valve assembly 45 is subjected to the pressure of secondary air flowing in the discharge passage 42a downstream of the orifice 43a as by connecting chamber 46 via port 41a in cap 41 and conduit 58 to a port 42b in connector 42.

During engine operation, secondary air from the air pump 22 enters into the controller 26 through inlet passage 50a and into chamber 47 at a pressure p1. P2 is the pressure of fluid in discharge passage 53a and chamber 48, while P3 is the pressure of fluid downstream of the orifice passage 43a, that is, the pressure in discharge passage 42a, which pressure is also communicated to chamber 46. Pressures P2 and P3 are primarily each dependent on engine exhaust flow and, in fact, the pressure differential between pressure P3 and pressure P2, that is, P3—P2, is proportional to exhaust flow. It will thus be apparent that during operation, in addition to the force of spring 57, the upper surface area A3 of this valve is subjected to a fluid pressure P3, while on its opposite side, the control valve assembly 45 is subjected over a surface area A1 thereof to a fluid pressure P1 and over a surface area A2 thereof to a fluid pressure P2. It will be seen that, with reference to FIG. 2, the pressure P1 will actually act against a predetermined area A1 of the valve 54 of valve assembly 45 while the pressure P2 acts against substantially a predetermined area A2 of the diaphragm 45a.

By proper selection of the areas A1, A2 and A3, with a spring 57 having a predetermined force F and with a predetermined sized orifice 43a, for example, a 5/32 inch diameter orifice, the control valve 45 of controller 26 will position itself relative to valve seat 52 to satisfy the following equation:

$$P1A1 + P2(A3-A1) = P1A1 + P2A2 = P3A3 + F \text{ spring}$$

The movement of the control valve 45 toward a closed position relative to the valve seat 52 will effect an increase in the pressure P1 to satisfy the above equation. The graph of FIG. 3 illustrates the changes in the pressures P1, P2 and P3 with increases in vehicle speed for a controller having a 5/32 inch diameter bleed orifice 43a.

It can also be shown that with the above areas A1, A2 and A3 fixed for a given controller 26 and with, of course, the area A3 greater than area A2 that the following equation applies:

$$P1 - KP3 = f(P3 - KP2)$$

and wherein K is a constant, that the flow of air through the bleed orifice 43a is proportional to (P1—KP3). Therefore, flow through the bleed orifice 43a to the reducing converter 14 is proportional to P3—KP2 and, therefore, proportional to the exhaust flow.

Test results, as illustrated in FIG. 4, with reference to a controller with a 5/32 inch diameter bleed orifice 43a have shown the pressure drop Δp across the bleed orifice, that is, P1—P3, to be a function of vehicle speed which is a modified function of engine flow and, therefore, of exhaust flow. Also, the percentage of secondary air, from air pump 22, delivered through the orifice 43a to a region ahead of the reducing converter 14 will be substantially constant at various vehicle speeds and, therefore, engine speeds or engine flow and this flow is a function of the bleed orifice 43a size only, as shown in the graph of FIG. 4 for a 5/32 inch diameter orifice.

Referring now to FIG. 5, there is illustrated an alternate embodiment of a controller, generally designated 26', which is so constructed as to permit easy modification of either ther orifice or control valve thereof for different size engines. As shown, controller 26' includes a manifold body or housing 60, a bottom cap 61, a threaded valve disk 62 and tubular insert 63, suitably fixed together to make up a controller housing.

Manifold housing 60 is provided on one side thereof with a tube connection 64 for connection to conduit 24 for entry of secondary air and at its other side with a tube connection 65 for connection to conduit 30 for discharge of secondary air to the region between the reducing converter 14 and oxidizing converter 16. The inlet passage 64a of tube connection 64 and the discharge passage 65a of tube connection 65 extend toward each other in spaced apart, over-lapping relationship and are interconnected through the aperture 62a of the valve disk 62 secured, as by threaded engagement, in housing 60. Communication between the passage 64a and passage 65a is effected through the predetermined sized circular passage 62a extending through valve disk 62, flow through which is controlled by the valve 66 of a differential fluid pressure actuated control valve, generally designated 68.

Manifold housing 60 is also provided with a discharge passage 70 intersecting passage 64a and with an enlarged stepped bore 71 intersecting one end of passage 65a to receive a tubular insert 63 and a valve stem guide 72.

Bottom cap 61 is provided with a tube connection 73 for connection to conduit 28 for discharge of secondary air to a region upstream of the reducing converter 14, the discharge passage 73a of this tube connection being in communication with the passage 70 in manifold housing 60 via a fixed size bleed orifice 74a in an orifice plate 74, suitably sandwiched between manifold housing 60 and bottom cap 61. Bottom cap 61 is also provided with a recessed opening 75 facing manifold housing 60 and axially aligned with the opening 63a through the insert 63 positioned in housing 60.

Control valve 68 includes the valve element 66 which is secured by a valve stem 76 to a diaphragm 77 having a piston 78 and a retainer plate 80 fixed on opposite sides of the diaphragm, as by having these elements sandwiched between a radial extending shoulder 76a on one end of the valve stem 76 and a fastener 79 threaded onto the free end of this valve stem. The diaphragm 77 is sandwiched at its outer periphery between the bottom cap 61 and one end of the insert 63, the opposite end of the insert abutting against the stem guide 72 seated against a suitable shoulder provided for this purpose in the manifold housing 60. Stem guide 72 is provided with a plurality of circumferentially spaced apart apertures 72a for the flow of air and a central guide aperture 72b to slidably receive the valve stem 76.

The insert 63, in the manifold housing 60, and bottom cap 61 make up with the diaphragm 77 and piston 78 two chambers, an upper chamber 81, with reference to FIG. 5, in communication with the passage 65a, and a lower chamber 82 which, via a port 83, is in communication with the passage 73a in the bottom cap 61 downstream of the bleed orifice 74a passage. A light spring 84 is preferably positioned within the chamber 82 to abut at one end against the retainer 80 and at its other end against an inner surface of the bottom cap 61 to normally bias the valve 66 toward a closed position, not shown, relative to the valve plate 62 to block the flow of secondary air from inlet passage 64a through the passage 62a into the exhaust passage 65a.

In the embodiment of the controller illustrated in FIG. 5, the inlet pressure in inlet passage 64a would work against the upper surface area of the valve 66 when in its closed or seated position relative to valve disk 62, the discharge pressure P2 in exhaust passage 65a would work against the area of the piston 78a and diaphragm 77 exposed to this pressure, that is, the upper surface area of this assembly, as shown in FIG. 5, and the discharge pressure P3 in discharge passage 73a flowing through the port 83 into the chamber 82 would act on the surface area 83 on this opposite side of the diaphragm, the bottom side with reference to FIG. 5. Otherwise, the operation of the controller 26' is similar to that disclosed with reference to FIG. 2 and the formulas previously described are equally applicable.

As will be readily apparent from the illustration of the controller 26' in FIG. 5, this design of the controller readily permits modification of the areas A1, A2 and A3 by simply changing valve plate 62 to one with a different size passage 62a therethrough changing the sizes of valve element 66 and insert 63, as desired, and it permits convenient access to the orifice plate 74 for the substitution of an orifice plate having a different size orifice 74a therethrough. Thus, this design of the controller 26' readily permits modification thereof to suit the requirements of a particular size engine and the emission control system associated therewith.

What is claimed is:

1. In an exhaust emission control system for an internal combustion engine, said system having catalytic converter means including a first catalyst bed and a second catalyst bed, conduit means connected to the engine for receiving exhaust gases discharged from the exhaust ports of the engine and defining a flow path for serially passing the exhaust gases through said first catalyst bed and said second catalyst bed and, means for providing secondary air to said catalyst beds, the improvement comprising a controller for receiving said air and directing a proportional amount of said air to said conduit means upstream of said first catalyst bed and for directing the remainder of said air to said conduit means intermediate said first catalyst bed and said second catalyst bed, said controller including means defining an inlet flow path for receiving said air, a first discharge flow path for delivery of air to said conduit means upstream of said first catalyst bed and a second discharge flow path operatively connected to said conduit means intermediate said first catalyst bed and said second catalyst bed, a fixed size orifice passage means positioned between said inlet flow path and said first discharge flow path and valve means positioned to control flow from said inlet flow path to said second discharge flow path, said vlave means including actuator means responsive on one side thereof to pressures in said inlet flow path and said second discharge flow path and on its other side to pressure in said first discharge flow path for effecting actuation of said valve means.

2. In an exhaust emission control system according to claim 1 wherein said system further includes air conduit means connected to said first discharge flow path and to said conduit means for delivery of air to said conduit means closely adjacent to said exhaust ports.

3. In an exhaust emission control system for an internal combustion engine, said system including conduit means connected to the engine for receiving exhaust gases discharged from the exhaust ports of the engine and delivering the exhaust gases serially through a reducing converter and an oxidizing converter and an air supply means for providing secondary air to said conduit means, the improvement comprising a controller having a housing means with an inlet passage operatively connected to said air supply means, a first discharge passage connected to said conduit means upstream of said reducing converter and a second discharge passage connected to said conduit means intermediate said reducing converter and said oxidizing converter, a fixed size orifice passage in said housing means interconnecting said inlet passage to said first discharge passage and valve means including a valve and a valve actuator connected together and positioned in said housing means for controlling the flow from said inlet passage to said second discharge passage, said valve and said valve actuator being acted on one side by the pressure in said first inlet passage and the pressure in said second discharge passage, respectively, and means associated with said housing means for subjecting the opposite side of said valve actuating means to the fluid pressure in said first discharge passage downstream of said orifice passage.

4. In an exhaust emission control system according to claim 3 wherein said system further includes air conduit means connected to one end to said first discharge passage of said controller and at its opposite end to said conduit means for delivery of air closely adjacent to said exhaust ports of the engine.

* * * * *